(12) United States Patent
May et al.

(10) Patent No.: US 7,039,907 B2
(45) Date of Patent: May 2, 2006

(54) METHOD OF PROTECTING ENTRY ADDRESSES

(75) Inventors: Christian May, München (DE); Jürgen Freiwald, Höhenkirchen (DE); Olaf Brixel, München (DE)

(73) Assignee: Infineon Technologies AG, Munich (DE)

( * ) Notice: Subject to any disclaimer, the term of this patent is extended or adjusted under 35 U.S.C. 154(b) by 745 days.

(21) Appl. No.: 09/829,328

(22) Filed: Apr. 9, 2001

(65) Prior Publication Data

US 2001/0039652 A1    Nov. 8, 2001

Related U.S. Application Data

(63) Continuation of application No. PCT/DE99/03169, filed on Oct. 1, 1999.

(30) Foreign Application Priority Data

Oct. 9, 1998  (DE) ................. 198 46 676

(51) Int. Cl.
*G06F 9/45* (2006.01)
(52) U.S. Cl. ............... 717/151; 717/159; 717/163
(58) Field of Classification Search ............. 717/151, 717/159, 163; 712/225–229
See application file for complete search history.

(56) References Cited

U.S. PATENT DOCUMENTS

| | | | | | |
|---|---|---|---|---|---|
| 4,439,828 | A | * | 3/1984 | Martin | 712/226 |
| 4,683,549 | A | * | 7/1987 | Takaki | 712/244 |
| 5,507,028 | A | * | 4/1996 | Liu | 712/207 |
| 5,515,519 | A |  | 5/1996 | Yoshioka et al. | |
| 5,797,014 | A | * | 8/1998 | Gheith | 717/163 |
| 5,802,242 | A | * | 9/1998 | Kawamura et al. | 386/68 |

FOREIGN PATENT DOCUMENTS

DE    197 09 975 A1    9/1998
EP    0 859 319 A1    8/1998

* cited by examiner

*Primary Examiner*—Kakali Chaki
*Assistant Examiner*—L Shrader
(74) *Attorney, Agent, or Firm*—Laurence A. Greenberg; Werner H. Stemer; Ralph E. Locher

(57) ABSTRACT

An efficient method for protecting entry addresses in computer programs allows direct jumps to permissible entry addresses. The permissible entry addresses are identified with a correlation of data which are not provided within the same individual instruction. By organizing the program code, the compiler or linker ensures that only legal entry addresses satisfy this correlation.

7 Claims, No Drawings

METHOD OF PROTECTING ENTRY ADDRESSES

CROSS-REFERENCE TO RELATED APPLICATION

This application is a continuation of copending International Application No. PCT/DE99/03169, filed Oct. 1, 1999, which designated the United States.

BACKGROUND OF THE INVENTION

Field of the Invention

The invention relates to a method of protecting entry addresses in computer programs.

For future smart cards it is intended that applications developed by third-party companies can call functions in the operating system. In this case, there could be a risk that these applications from third-party companies attempt to manipulate or sabotage other program parts. Such a possible attack could be performed by using a different entry address rather than using a valid function pointer to an operating system routine from the application. In consequence, the operating system code would not be carried out correctly and could, for example, provoke possible data losses resulting from a memory area being incorrectly overwritten.

One solution to overcome the above-described problem provides an entry point or vectoring to predefined addresses (so-called "gates") at fixed intervals. In this case, it is first of all necessary to check whether a gate address is located within the range of the permissible addresses for that module. If the result is positive, a jump is made to that gate, and a further jump is then made from there to the actual function. This is disadvantageous since a calculated jump must be carried out in this case, which leads to a so-called "peephole" in the CPU (Central Processing Unit) pipeline. Alternatively, the jump to the function can be carried out with a delay after a number of prioritized program instructions of that function. This leads to a difficult optimization problem for the compiler if a loop is initiated at the start of the function and it is necessary to continuously jump backward and forward between the code at the gate and the remote code.

SUMMARY OF THE INVENTION

It is accordingly an object of the invention to provide a method of protecting entry addresses which overcomes the above-mentioned disadvantages of the heretofore-known methods of this general type and which requires no calculated jumps and thus causes no peephole in the pipeline of the CPU instructions.

With the foregoing and other objects in view there is provided, in accordance with the invention, a method for protecting entry addresses, which includes the steps of:

identifying a permissible entry address by using a correlation of data, wherein the data are not provided within the same individual instruction; and storing, in a memory cell, an address of a correlated data item directly before or directly after the permissible entry address.

The object of the invention is achieved by allowing a jump directly to permissible entry addresses, wherein the permissible entry addresses can be identified by a correlation of data which cannot occur within the same, individual instruction.

In this case, an organization of the program code allows the compiler or linker to ensure that only legal entry addresses satisfy this correlation. For example, the correlation process can be carried out by providing that the memory cell contains the address of correlated data items directly before or after the entry address.

A preferred mode of the invention provides that the memory cell contains a reference to the corresponding data entry in a protected list of legal entry addresses, the reference being provided directly before or after the entry address.

According to another mode of the invention, a direct jump to the permissible entry address is provided.

In this case, it is particularly preferable to carry out an automatic check when executing the function call, in order to determine whether the correlation of the data is satisfied.

With the objects of the invention in view there is also provided, a method for protecting entry addresses, which includes the steps of:

identifying a permissible entry address by using a correlation of data, wherein the data are not provided within the same individual instruction; and providing the correlation of data as a correlation with program data in non-reserved memory areas.

It is particularly preferable to carry out an additional automatic check during execution of the function call in order to determine whether the correlated data item is in the reserved memory area provided for this purpose.

If program instructions do not exceed a certain maximum number n of bytes, a further solution according to the invention can be used, wherein a specific no-operation code is provided which is used to avoid random correlations and which can be inserted retrospectively by the compiler or linker.

In this case, it is particularly preferable to carry out the correlation between code data items which are at least n bytes away from one another.

Furthermore, according to the invention, the entry address can be protected by the insertion of a specific byte sequence, which cannot occur within the regular code, for example by using a specific no-operation code.

Thus, according to the invention, the peephole in the pipeline can be avoided by jumping directly to the address of the function pointer. However, to do this, it is necessary to ensure that legal jump addresses are distinguished by non-local code correlations. The program code must be organized to allow the compiler or linker to ensure that only legal function jump addresses satisfy this correlation. "Non-local correlation" in this case means a correlation of data items which cannot occur within the same, individual instruction.

DESCRIPTION OF THE PREFERRED EMBODIMENTS

The following preferred embodiments of the invention are for example feasible:

1. Correlation with data in memory areas reserved for this purpose: A simple implementation could, for example, include the address of a correlated data item which, for example, once again corresponds to the legal entry address of the function, directly before the entry address in the memory cell. When the function call is executed, an automatic check can be carried out to determine whether this correlation is satisfied and/or whether the correlated data item is in the intended, reserved memory area. At first glance, the mechanism is very similar to the previous gate mechanism, but has the advantage that no calculated jump takes place, and the function instructions can be placed directly in the prefetcher of the pipeline. A peephole occurs only in the erroneous situation of an illegal vector.

2. Correlation with program data in non-reserved memory areas. This solution presupposes that the program instructions do not exceed a certain maximum number n of bytes. Data areas in the code segment longer than that must then be excluded.

Furthermore, this method is dependent on a specific no-operation code (SNOP) which is never used in the regular code and is inserted retrospectively by the compiler/linker solely to avoid random correlations. It is thus possible to distinguish between two different types of solution here:

(a) The correlation is done between the code data items which are at least n bytes away from one another. The compiler or linker must in this case ensure that any random correlations in the code are avoided by introducing SNOP intermediate codes.

One possible implementation is as follows: directly before the entry address of the function, there is a value which is a function of the subsequent n+m (m≧0, otherwise arbitrary) bytes. Should this correlation be satisfied randomly anywhere in the code, then the compiler or linker must cancel this random correlation: since, according to the assumption, at least one real instruction will end in the sequence of n+m bytes, a series of SNOP instructions can be inserted after the end of such a real instruction, until the function value changes. Within certain limits, the function can in this case be chosen freely.

(b) The entry address is protected by the insertion of a specific byte sequence which cannot occur within the regular code. One example of this is a sequence of OP-codes (SNOP).

Thus, according to the invention, the entry addresses for functions are protected by non-local code correlations which can occur only at the entry addresses.

This therefore advantageously avoids the gate mechanism, which results in a calculated jump and causes a peephole in the instruction pipeline.

Instead of this, a direct jump to the entry address is performed for jumping into in the function. The subsequent instruction can be loaded into the pipeline irrespective of whether the verification of the jump address turns out to be positive or negative. This therefore improves the efficiency of monitored function calls.

We claim:

1. A method for protecting entry addresses, the method which comprises:

verifying a permissible entry address by using a correlation of data, wherein the data are not provided within a same individual instruction for authenticating the permissible entry address of a computer program; and storing, in a memory cell, an address of a correlated data item directly before or directly after a program instruction at the permissible entry address.

2. The method according to claim 1, which comprises storing, in the memory cell, a reference to a data entry in a protected list of legal entry addresses one of directly before and directly after the permissible entry address.

3. The method according to claim 1, which comprises directly jumping to the permissible entry address.

4. The method according to claim 1, which comprises automatically checking whether the correlation of data is satisfied for a respective entry address, when a function call is carried out.

5. A method for verifying entry addresses of a computer program, the method which comprises:

verifying a permissible entry address by using a correlation of data, wherein the data are not provided within a same individual instruction;

providing the correlation of data as a correlation with program data in non-reserved memory areas;

providing the correlation of data as a correlation between code data items, the code data items being disposed at a distance exceeding a maximal length of program instructions;

providing a specific no-operation code for avoiding random correlations.

6. A method for protecting entry addresses, the method which comprises:

verifying a permissible entry address by using a correlation of data, wherein the data are not provided within a same individual instruction;

providing the correlation of data as a correlation with program data in non-reserved memory areas;

providing a specific byte sequence which cannot occur within a regular code, the specific byte sequence being selected to avoid random correlations.

7. The method according to claim 6, which comprises using a specific no-operation code as the specific byte sequence.

\* \* \* \* \*